(12) United States Patent
Lee et al.

(10) Patent No.: US 9,116,227 B2
(45) Date of Patent: Aug. 25, 2015

(54) HYBRID RADAR INTEGRATED INTO SINGLE PACKAGE

(75) Inventors: Jae Seung Lee, Ann Arbor, MI (US); Paul Donald Schmalenberg, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 601 days.

(21) Appl. No.: 13/401,977

(22) Filed: Feb. 22, 2012

(65) Prior Publication Data

US 2013/0214961 A1    Aug. 22, 2013

(51) Int. Cl.
| | |
|---|---|
| G01S 13/00 | (2006.01) |
| G01S 3/74 | (2006.01) |
| G01S 13/93 | (2006.01) |
| H01Q 3/26 | (2006.01) |
| G01S 7/52 | (2006.01) |
| G01S 13/02 | (2006.01) |

(52) U.S. Cl.
CPC ............ G01S 3/74 (2013.01); G01S 13/931 (2013.01); H01Q 3/26 (2013.01); *G01S 7/52003* (2013.01); *G01S 7/52047* (2013.01); *G01S 2013/0254* (2013.01); *G01S 2013/9342* (2013.01); *G01S 2013/9346* (2013.01)

(58) Field of Classification Search
CPC ... G01S 7/52003; G01S 7/52047; G01S 3/74; G01S 13/931; G01S 13/26; G01S 2013/9342; G01S 2013/9346; G01S 2013/0254; H01Q 3/26
USPC .......................................................... 342/27
See application file for complete search history.

(56) References Cited

U.S. PATENT DOCUMENTS

| | | | |
|---|---|---|---|
| 5,262,789 A | 11/1993 | Silverstein | |
| 5,467,072 A | 11/1995 | Michael | |
| 6,249,251 B1* | 6/2001 | Chang et al. | 342/378 |
| 6,337,654 B1* | 1/2002 | Richardson et al. | 342/90 |
| 6,756,939 B2 | 6/2004 | Chen et al. | |
| 6,882,311 B2 | 4/2005 | Walker et al. | |
| 7,423,578 B1 | 9/2008 | Tietjen | |
| 7,474,262 B2 | 1/2009 | Alland | |
| 7,545,324 B2 | 6/2009 | Kalian et al. | |
| 7,737,879 B2 | 6/2010 | Tietjen et al. | |
| 7,868,828 B2 | 1/2011 | Shi et al. | |
| 7,965,234 B2 | 6/2011 | Park et al. | |
| 8,009,082 B2 | 8/2011 | Shinoda et al. | |
| 2005/0030228 A1* | 2/2005 | Judd | 342/383 |
| 2009/0009392 A1 | 1/2009 | Jacomb-Hood et al. | |
| 2009/0085800 A1 | 4/2009 | Alland et al. | |
| 2009/0322592 A1 | 12/2009 | Kai | |
| 2010/0328157 A1 | 12/2010 | Culkin et al. | |

* cited by examiner

*Primary Examiner* — Frank J McGue
(74) *Attorney, Agent, or Firm* — Gifford, Krass, Sprinkle, Anderson & Citkowski, P.C.

(57) ABSTRACT

A radar apparatus includes a phased array receiver, with a steerable receive beam. The receiver elements are grouped into subarrays, which each provide a subarray signal to a mixer. The mixer signals are then used by a DBF algorithm to determine narrow virtual beams within the receive beam. The receive beam is used to obtain radar data from sectors of the field of view, and the sectors may be approximately as wide as the receive beam. The order in which sectors are examined may be determined by the sector importance, related to the presence, nature, and/or behavior of previously tracked targets within each sector.

11 Claims, 3 Drawing Sheets

Traditional DBF Radar

Sectoral Processing

HYBRID RADAR INTEGRATED INTO SINGLE PACKAGE

FIELD OF THE INVENTION

The invention relates to radar apparatus and methods, in particular phased array radars for vehicular use.

BACKGROUND OF THE INVENTION

Radar apparatus are used on vehicles, for example, for collision avoidance and other applications. In a conventional digital beam forming (DBF) radar, a wide field of view is irradiated, and a digital beam former is used to create a virtual beam to track targets within the field of view. Another type of radar is the phased array radar, which forms a real beam to track targets.

SUMMARY OF THE INVENTION

Examples of the present invention include a hybrid radar, using a phased array radar to create a real beam, and a digital beam forming (DBF) approach to form narrower virtual beams within the real beam.

A phased array radar can be implemented almost completely in hardware, so that digital processing demands are very small compared to a DBF radar. A conventional phased array requires only one mixer, so large arrays can fit easily into a single chip. However, conventional phased array radars do not have the advantages of complex optimization routines used by a digital beam former. However, a conventional digital beam former conventionally has a large hardware footprint and computational requirements limit the number of available channels, reducing radar performance.

In examples of the present invention, aspects of the phased array and DBF radar approaches are combined to eliminate each technology's weakness by augmenting it with the other's strength. In some examples, radar circuitry may be contained within a single silicon chip, minimizing complexity.

An example radar apparatus includes a transmitter (which may be a phased array transmitter), and a phased array receiver. Each phased array element of the receiver includes an antenna element, optional amplifier stages, and a phase shifter. The phase shifters, receiving the antenna signals, may be electronically controlled to steer the receive beam to a chosen sector of the field of view. The receive beam may also be referred to as a real beam, to distinguish from virtual beams synthesized by DBF processing.

The phased array elements are grouped into subarrays, each subarray including at least two phased array elements. The subarrays provide a subarray signal to an associated mixer, the subarray signal being the combined signal from the phased array elements within the subarray. The apparatus includes a plurality of mixers, one mixer per subarray, each mixer receiving the subarray signal from its associated subarray. The mixers also receive a local oscillator signal from a local oscillator, and generate mixer signals provided to a digital beam former (DBF). The DBF then synthesizes (i.e. determines by digital processing) virtual beams within the receive beam. A local oscillator is used to generate the local oscillator signal, and an electrical interconnection arrangement is used to convey the local oscillator signal to each mixer.

In radar operation, an antenna controller energizes the transmitter and steers the receive beam (received by the phased array receiver) by adjusting the phase shifters. The phase shifters may be electronically controlled components that may be integrated into a silicon chip. The receive beam is a real beam having an angular width, which may be broadened by the subarray grouping, compared to the beam of a conventional phased array antenna. The digital beam former determines virtual beams from the mixer signals, the virtual beam being narrower than the real beam and located within the angular width of the real beam. As non-limiting examples, the real beam may be subdivided into N virtual beams, where N may be between 2 and 4096, for example between 4 and 64. Hence, the DBF provides super-resolution within the real beam, aiding target identification.

The digital beam former may be provided by an electronic control circuit, including a processor and receiving the mixer signals. The electronic control circuit may then identify targets within the radar data, for example in terms of range and Doppler shift. The digital beam former may use a digital beam forming algorithm executed by the processor. The electronic control circuit may further be used to control the phased array antenna, for example by energizing the transmitter and steering the phased array receiver by electronic control of the phase shifters. In some examples, the transmitter may be a phased array transmitter, and steered to a similar portion of the field of view from which the receive beam originates.

An example method of operating a radar apparatus, in particular a vehicle radar, includes steering a receive beam to a sector of the field of view using a phased array receiver, through adjusting phase shifters in the receive antenna elements. Radar data from the sector, and a plurality of virtual beams are determined within the receive beam using a digital beam forming algorithm. The virtual beams each have a narrower beamwidth than the receive beam.

In an example method, the field of view is divided into a plurality of sectors, and the sectors are given an importance parameter. The importance parameter may reflect various conditions of the vehicle environment, such as the presence, range, relative velocity, and nature of targets within the vehicle environment. The importance parameter may be determined using target tracking data obtained from previously collected radar data.

The receive beam is steered to each sector in turn, in descending order of importance parameter, data collected, and the DBF algorithm executed on the data to identify the virtual beams. The DBF algorithm is used to give super-resolution over the sector corresponding to the receive beamwidth, rather than over the whole field of view, reducing computational demands.

The importance parameter may be revised based on the collected data, and the process is repeated for the sectors. The phased array receive antenna may include subarrays of phased array antenna elements, each subarray having an associated mixer receiving a local oscillator signal and a subarray signal, the digital beam forming algorithm using output signals from the mixer to determine the plurality of virtual beams.

Examples of the present invention include radars for vehicle use, for example land vehicle use, including automotive radar apparatus.

DETAILED DESCRIPTION OF THE PREFERRED EMBODIMENTS

An example radar apparatus includes a phased array receiver with a steerable real receive beam. The phased array receiver elements are grouped into subarrays, each subarray providing a combined subarray signal to an associated mixer. The mixer signals are then used by a DBF algorithm to determine narrow virtual beams within the receive beam.

The receive beam is used to obtain radar data from sectors of the field of view, and the sectors may be approximately as wide as the receive beam. A DBF algorithm is used to determine high resolution virtual beams within the chosen sector. The order in which sectors are examined may be determined by the sector importance, related to the presence, nature, and behavior of previously tracked targets. The receive beam is steered by the phased array receiver to the desired sector, and the digital beam former (e.g. provided by digital signal processor) determines relatively narrow virtual beams within the receive beam.

Figure 1:
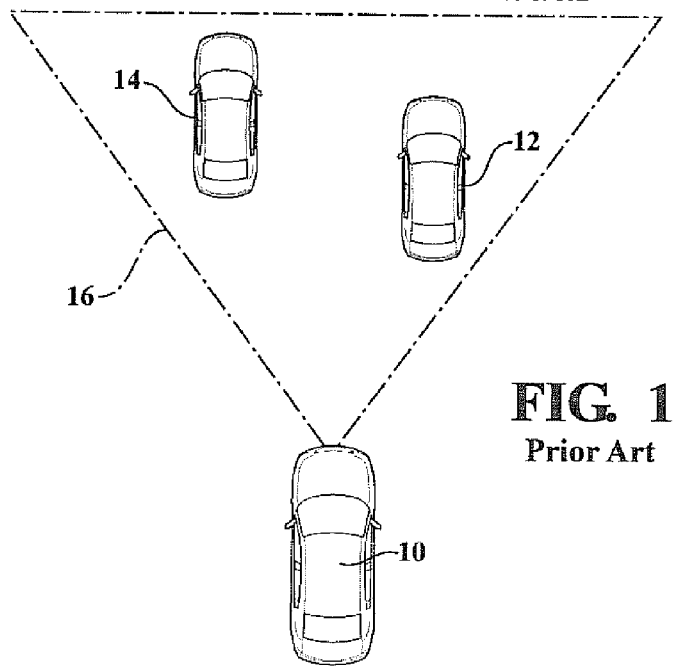
FIG. 1 (prior art) illustrates a traditional DBF (digital beam forming) radar.

FIG. 1 illustrates operation of a traditional DBF radar. Vehicle 10 is equipped with the DBF radar, which illuminates a wide field of view including nearby vehicles 14 and 12. The triangle 16 is a simplified representation of the field of view of a radar. A conventional digital beam forming radar reads in all data from the radar's field of view, and computes all angles at the same time. However, by illuminating the entire field of view, noise and multiple scattering effects can be increased, reducing the radar's signal to noise.

Figure 2:
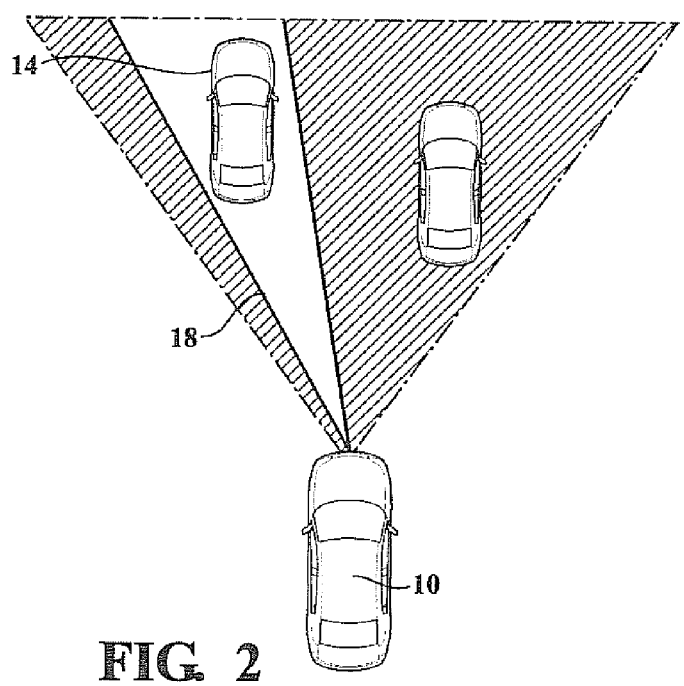
FIG. 2 illustrates the concept of sectoral DBF processing.

FIG. 2 illustrates the sectoral DBF processing concept. The vehicle 10 includes a phased array radar that produces real beam 18. In this example the real beam field of view only includes vehicle 14.

The hardware phase shifters or the receive antenna form a real beam such that only a fraction of the entire field of view of the radar is covered. The beam may have a larger half power beam width than a conventional phased array radar beam. However, the beam width is significantly narrower than the entire wide field of view of the conventional DBF radar illustrated in FIG. 1.

The real beam can be steered using conventional phased array methods to a predetermined sector within the overall field of view. In this example, the sectors are slices of the whole field of view of the radar. A digital beam forming (DBF) optimization technique is then used to form narrow virtual beams within the sector. Optimization techniques may be those already used with conventional DBF radars, such as beam forming algorithms such as MUSIC (multiple signal classification) and ESPRIT (estimation of signal parameters via rotational invariant technique). However, other algorithms, such as those taking advantage of semi-definite relaxation and combinatorics, can also be used.

Figure 3:
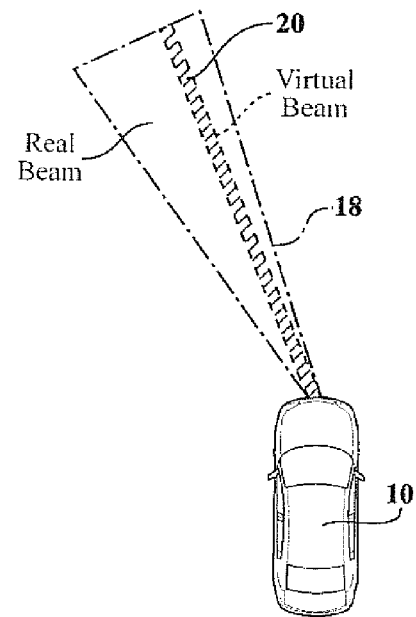
FIG. 3 further illustrates creation of a virtual beam using DBF techniques within the real beam of a phased array radar.

FIG. 3 shows a radar apparatus on vehicle 10 producing a real beam 18, similar to that shown in FIG. 2, the beam forming algorithms forming a narrower virtual beam 20 within the width of the real beam 18. The DBF algorithm may solve for multiple virtual beams over the real beam field of view simultaneously. The virtual beam can be significantly narrower than the real beam. Data may be obtained simultaneously from virtual beams created across the full angular range of the real beam.

The real beam can be steered to other sectors within the radar field of view, and for each sector corresponding virtual beams are formed within the steered beam. In this way, high resolution radar coverage of the vehicle environment can be achieved.

Figure 4:
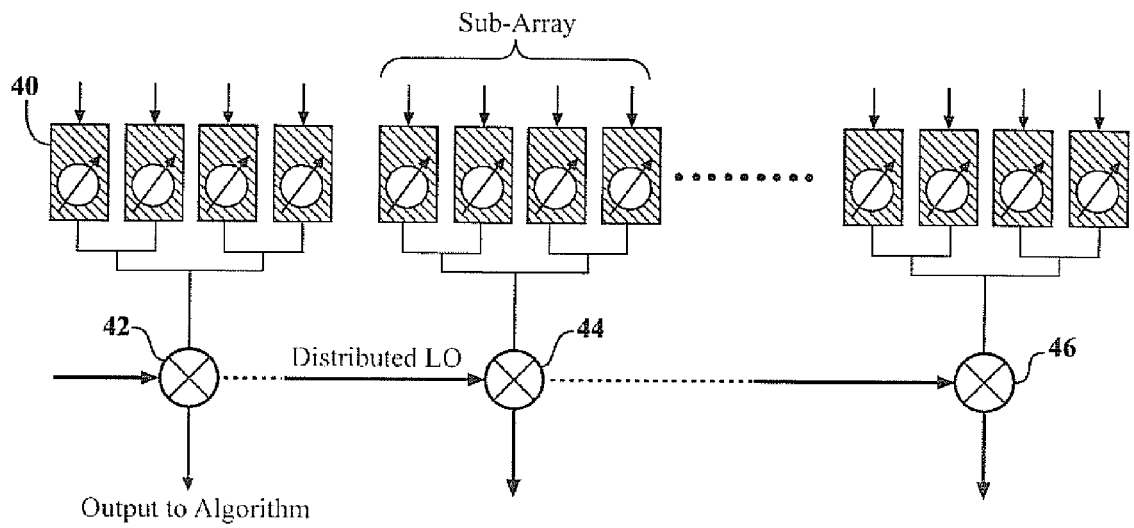
FIG. 4 illustrates an example received phased array, the phased array elements being grouped into subarrays each having their own mixer.

FIG. 4 shows a configuration of phase shifters and mixers within an example radar apparatus. FIG. 4 shows a first subarray including phase shifter 40 providing subarray subarray output to mixer 42. The output of a second subarray is fed to mixer 44, and the output of an arbitrary Nth subarray is fed to mixer 46. A plurality of mixer outputs are obtained, and these are fed to the input of a digital beam forming algorithm.

In a conventional phased array, the output of all phase shifters are grouped together and fed to a single mixer. However, in the configuration of FIG. 4, phase shifters are grouped within subarrays, and the output of each subarray is directed to an individual mixer. The phase shifters of each subarray are grouped together, but the outputs of each subarray are not grouped together. In some examples, there can be anywhere between 2 and 128 phase shifters in each subarray, for example between 2 and 32.

Each subarray has an associated mixer, receiving the subarray output, and each mixer is fed by a common distributed local oscillator (LO) signal. The distributed LO signal is phase and amplitude matched at each mixer input, so that the LO signal phase and amplitude are the same for each mixer. In one approach, this may be achieved using branching electrical connectors to give similar path lengths between the LO generator and each input mixer. Each mixer output is sent to an analog to a digital converter so that the beam former algorithm can perform optimized beam forming.

In some examples, the complete device can be implemented in a single chip, such as a single silicon chip, which includes all hardware phase shifters for transmit and receive phased array antennas, mixers, and LO distribution. Other radar functions may also be included on the same chip.

The hardware phase shifters form a real beam, illuminating or receiving signals from a sector of the radar field of view. The radar's field of view can be dynamically sectored based on previous measurements. Each sector may have the width of half the power beam width of the real radar real.

Figure 5:
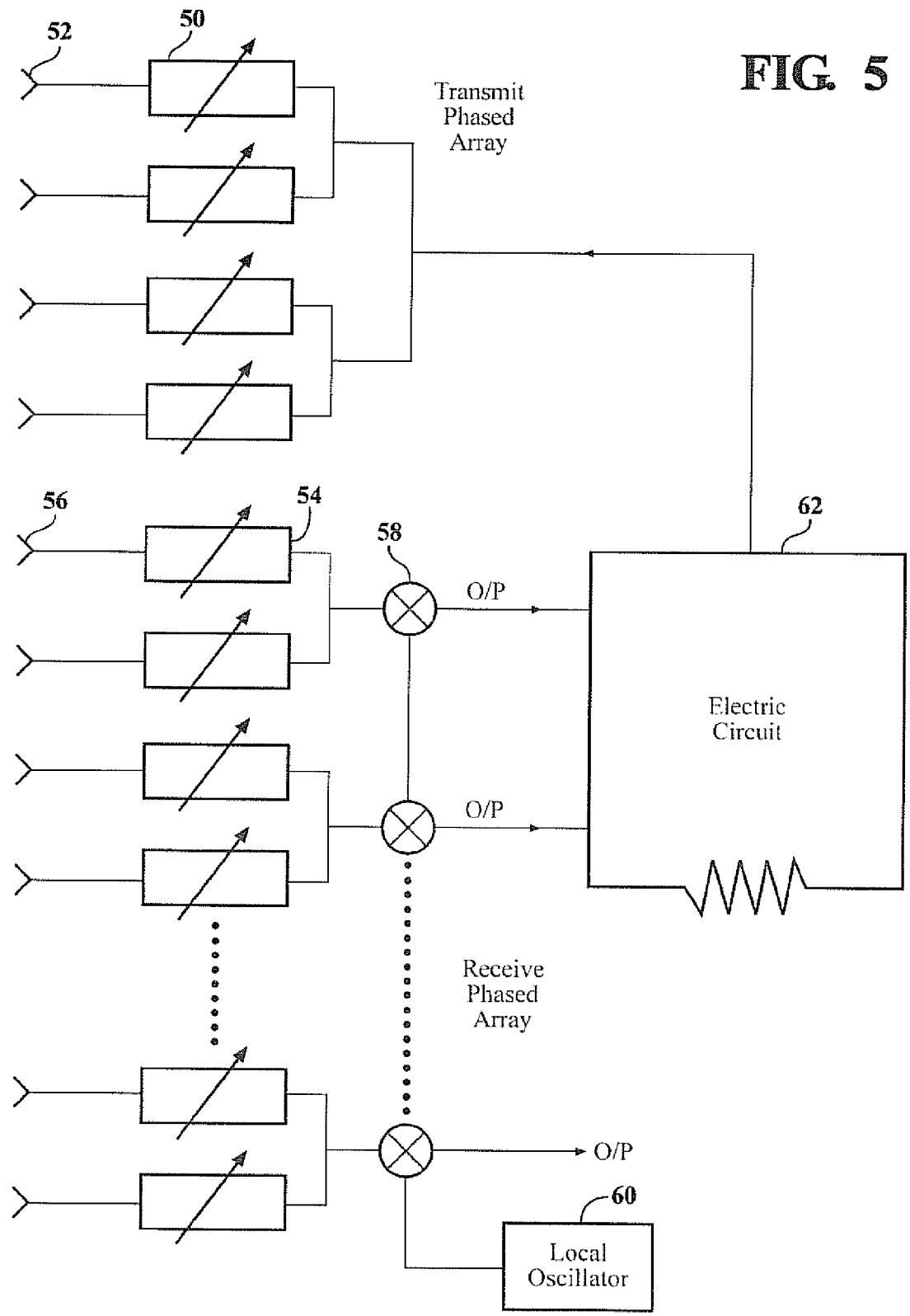
FIG. 5 is a further schematic of radar apparatus according to an example of the present invention.

FIG. 5 is a further schematic illustrating an example apparatus. The apparatus includes a transmit phased array including phased array elements such as phase shifter 50 in electrical communication with antenna radiative element 52. The radar apparatus also includes a receive phased array including phased shifters such as phase shifter 54 and antenna receive element such as 56. There may be one or more amplifier elements (not shown) between each phase shifter and the associated antenna radiative or receive element.

A local oscillator 60 provides a local oscillator signal which is fed to each mixer, such as mixer 58. The electrical connection pattern is not shown in this figure, but the local oscillator distribution network will typically be configured so that the LO signal arriving at each mixer input has the same phase and amplitude. Alternatively a software adjustment in the digital processing for phase offsets between the LO signals input to each mixer.

An electronic control circuit 62 receives mixer signals, and includes a processor executing the DBF algorithm. The electronic control circuit also provides electronic phase shifting signals to the phase shifters (electrical connections not shown for clarity), allowing transmit and receive beams to be steered.

As previously discussed, the phased array elements are grouped into subarrays, and each subarray output is fed to an associated mixer. There is one mixer per subarray, so that the number of mixers is the same as the number of subarrays. As a result, a plurality of mixer outputs are obtained for a single receive beam. The mixer outputs are then received by a digital processing circuit, such as an electronic circuit including a CPU or other processor, and used by a digital beam forming algorithm executed by the processor to determine virtual beams.

After the field of view is sliced into sectors, the sectors may then be ranked in their importance based on previous measurements, usually as computed by a tracking filter. The beam is first steered using the phase shifters to adjust the real beam to cover the sector with the highest rank, and then other sectors are covered by descending order of importance. In some examples, some sectors may be skipped if of low importance, before repeat coverage of the field of view. Tracking filters may be used to predict the motion of targets across the field of view, allowing improved importance ranking of the sectors based on previously collected data.

For each sector, starting with the identified most important sector, radar signals are received, and a virtual beam formed within the sector using a digital beam forming algorithm executed by a processor, such as the central processing unit (CPU) of a computerized control system. Important signals returning from the sector are solved for position and speed using the optimization algorithm, and the results used to update the tracking filters.

The real beam is then moved to the second highest rank sector and the process repeated. An advantage of the described approach is that the beam is positioned before optimization, and this reduces the area for DBF optimization and the digital signal processing demands. The reduced angular area under consideration saves on computing power.

The signal to noise ratio is increased relative to a traditional DBF radar in which signals are received from the entire radar field of view, as sources of noise are reduced. The allowable update rate of the radar is also increased.

Figure 6:
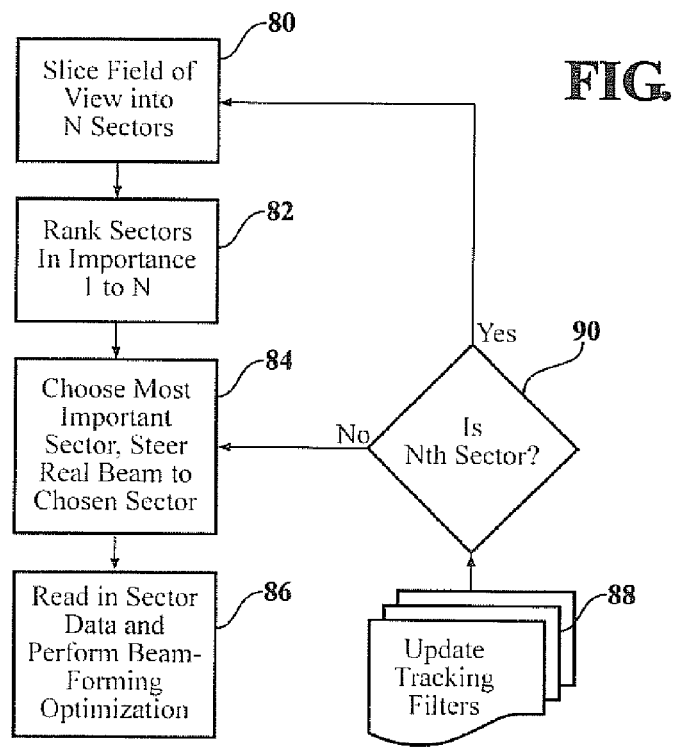
FIG. 6 is a flow chart illustrating identification of the most important sector within radar operation.

FIG. 6 is a flow chart illustrating the sector ranking approach. Box 80 corresponds to slicing the field of view into N sectors. As non-limiting examples, N may be in the range 2-64, for example in the range 4-32 inclusive. Box 82 corresponds to ranking sectors in importance from 1 to N. Typically this will be achieved using a tracking filter, or otherwise achieved using previously collected data. For example, the most important sector may contain the greatest number of radar targets, the closest target, or a target identified as a collision hazard. In the absence of any previous data, the sectors may be ranked in an arbitrary manner, or otherwise. Box 84 corresponds to steering the real beam produced by the phased array radar to the most important sector. Box 86 corresponds to reading in sector radar data and performing beam forming optimization. Box 88 corresponds to updating the tracking filters based on the collected data. Box 90 corresponds to deciding if this is the Nth sector. The process is repeated for each of the N sectors, and after the process is complete for all sectors, the process returns to Box 80. However, if not all sectors have been examined, the next most important sector is then chosen at Box 84 and the process of Box 86 and 88 repeated.

In some examples, the receive beam is scanned across the field of view without identification of sector importance.

In some examples a hybrid array can be integrated into a single chip. The mixer layout and local oscillator distribution network are configured so that channel signals own phase and amplitude match. Within the chip, isolation fences (including conducting elements) may be used to isolate the powerful transmit signal from the relatively low power received signal. The chip can be realized through many different silicon based technologies, for example but not limited to SiGe, BiCMOS, Si—RF, and the like. In some examples, the voltage control oscillator itself and phase-locked loop detection circuitry may be located on a separate chip, to reduce interference.

In some examples, the receive antenna may be dynamically reconfigured to provide up to N separate receive beams, where N is the number of mixers. If the number of real beams is less than N, then DBF analysis may be applied to some or all of the real beams.

Examples of the present invention also include improved methods and apparatus for collision avoidance during vehicle operation. For example, the narrow virtual beams formed by the DBF may be used to improve target identification and characterization, and the target characteristics such as range and relative velocity may be used to trigger vehicle inputs for collision avoidance, such as steering or brake inputs.

In some examples, the number of sectors may be dynamically reconfigured. For example, if more targets are detected, the number of sectors may be increased.

The invention is not restricted to the illustrative examples described above. Examples described are not intended to limit the scope of the invention. Changes therein, other combinations of elements, and other applications will occur to those skilled in the art.

Having described our invention, we claim:

1. An apparatus, the apparatus being a radar apparatus comprising:
    a transmitter sending out a signal;
    a phased array receiver, including a plurality of phased array elements configured to receive a receive beam, wherein the receive beam is an echo of the signal,
    each phased array element including an antenna element and a phase shifter,
    the phased array elements being grouped into subarrays, each subarray including at least two phased array elements and providing a sub array signal;
    a plurality of mixers, each mixer receiving the subarray signal from an associated subarray,
    each mixer further receiving a local oscillator signal and generating a mixer signal;
    a digital beam former, receiving mixer signals from the plurality of mixers;
    a local oscillator, generating the local oscillator signal;
    a database storing recorded tracked targets identified by the receive beam; and
    a phased array antenna controller and a processor, the phased array antenna controller operable to steer the receive beam received by the phased array receiver, the receive beam having an angular width,
    the digital beam former determining a virtual beam from the mixer signals, the virtual beam being narrower than the receive beam and located within the angular width of the receive beam, the processor processing both the database and the receive beam so as to determine a virtual beam within the receive beam based upon the presence and nature of a recorded target.

2. The apparatus of claim 1, the digital beam former being provided by an electronic control circuit.

3. The apparatus of claim 2, the digital beam former being provided by a digital beam forming algorithm executed by the processor.

4. The apparatus of claim 3, the digital beam forming algorithm being selected from a group of algorithms consisting of a MUSIC (multiple signal classification) algorithm and an ESPRIT (estimation of signal parameters via rotational invariant technique) algorithm.

5. The apparatus of claim 1, the electronic control circuit further including the phased array antenna controller and being operable to steer the receive beam.

6. The apparatus of claim 1, the transmitter being a phased array transmitter.

7. The apparatus of claim 1, the number of mixers being equal to the number of subarrays.

8. The apparatus of claim 1, the apparatus being a vehicle radar adapted for mounting on a land vehicle.

9. A method of operating a radar to identify radar targets, the radar having a receive beam generated by a return signal of the radar, the radar further including a field of view, the method comprising:
   steering the receive beam to a sector of the field of view using a phased array receiver;
   processing the receive beam to detect a target and the nature and behavior of the target, wherein the tracked targets are recorded;
   dividing the field of view into a plurality of sectors;
   according an importance parameter to each sector of the plurality of sectors, wherein the importance parameter is determined using presence and nature and behavior of the recorded targets;
   receiving radar data from the sector;
   determining a plurality of virtual beams within the receive beam using a digital beam forming algorithm to analyze the radar data,
   the virtual beams each having a narrower beamwidth than the receive beam,
   the virtual beams being used to identify the radar targets; and
   steering a real beam to each sector of the plurality of sectors in descending order of importance parameter.

10. The method of claim 9, the phased array receiver including subarrays of phased array antenna elements,
    each subarray having an associated mixer, the associated mixer receiving a local oscillator signal and a subarray signal from the subarray,
    the digital beam forming algorithm using output signals from the mixer to determine the plurality of virtual beams.

11. The method of claim 9, the radar being a vehicle radar, the method being a method of operating the vehicle radar.

* * * * *